(12) United States Patent
Mori et al.

(10) Patent No.: US 7,677,061 B2
(45) Date of Patent: Mar. 16, 2010

(54) SOCKS OF MULTI-STAGE PILE STRUCTURE

(75) Inventors: Miyuki Mori, Kitakatsuragi-gun (JP);
Takao Fukui, Kitakatsuragi-gun (JP);
Toshio Ando, Kitakatsuragi-gun (JP);
Makoto Ohata, Kitakatsuragi-gun (JP);
Hideo Hirano, Kitakatsuragi-gun (JP)

(73) Assignee: Okamoto Corporation, Nara (JP)

( * ) Notice: Subject to any disclaimer, the term of this patent is extended or adjusted under 35 U.S.C. 154(b) by 195 days.

(21) Appl. No.: 11/663,931

(22) PCT Filed: Sep. 6, 2005

(86) PCT No.: PCT/JP2005/016303

§ 371 (c)(1),
(2), (4) Date: Mar. 27, 2007

(87) PCT Pub. No.: WO2006/038415

PCT Pub. Date: Apr. 13, 2006

(65) Prior Publication Data

US 2008/0041113 A1    Feb. 21, 2008

(30) Foreign Application Priority Data

Sep. 30, 2004   (JP)   ............................. 2004-285711

(51) Int. Cl.
*A41B 11/00* (2006.01)
(52) U.S. Cl. ...................................................... 66/185
(58) Field of Classification Search ............... 66/178 R, 66/182, 185, 186, 187
See application file for complete search history.

(56) References Cited

U.S. PATENT DOCUMENTS

| | | | | |
|---|---|---|---|---|
| 4,253,317 A | * | 3/1981 | Howard et al. ................ | 66/186 |
| 4,255,949 A | * | 3/1981 | Thorneburg ................... | 66/185 |
| 4,732,015 A | * | 3/1988 | Abrams et al. ............ | 66/172 E |
| 5,560,226 A | * | 10/1996 | Throneburg ................... | 66/185 |
| 5,603,232 A | * | 2/1997 | Throneburg ................... | 66/185 |
| 5,791,163 A | * | 8/1998 | Throneburg ............... | 66/178 R |
| 6,230,525 B1 | * | 5/2001 | Dunlap ......................... | 66/182 |
| 6,324,874 B2 | * | 12/2001 | Fujimoto ...................... | 66/185 |

FOREIGN PATENT DOCUMENTS

| JP | 55-132701 | 10/1980 |
|---|---|---|
| JP | 57-180708 | 11/1982 |

(Continued)

*Primary Examiner*—Danny Worrell
(74) *Attorney, Agent, or Firm*—William L. Androlia; H. Henry Koda

(57) ABSTRACT

To provide a sock with a performance that matches its purpose of use and seasonal requirements. To change the thickness and strength of different parts of the sock according to the load distribution on the sole and the impact that the different parts of the sock are subjected to when walking and running.

Knitting structures of different thicknesses and airspace ratios, e.g., flat stitches P, short-terry stitches SP, long-terry stitches LP, mesh stitches M, short-terry stitches based on mesh stitches M-SP, long-terry stitches based on mesh stitches M-LP, short-terry stitches based on reinforced mesh stitches M-R-SP, long-terry stitches based on reinforced mesh stitches M-R-LP, short-terry stitches with reinforcement yarn R-SP and long-terry stitches with reinforcement yarn R-LP are distributed in different parts of the sock.

4 Claims, 9 Drawing Sheets

FOREIGN PATENT DOCUMENTS

| | | |
|---|---|---|
| JP | 58-42104 | 3/1983 |
| JP | 58-68904 | 5/1983 |
| JP | 58-115723 | 8/1983 |
| JP | 60-165405 | 11/1985 |
| JP | 9-41202 | 2/1997 |
| JP | 3037207 | 2/1997 |
| JP | 2001-295104 | 10/2001 |
| JP | 2002-371401 | 12/2002 |
| JP | 2003-119601 | 4/2003 |
| JP | 2003-138401 | 5/2003 |

* cited by examiner

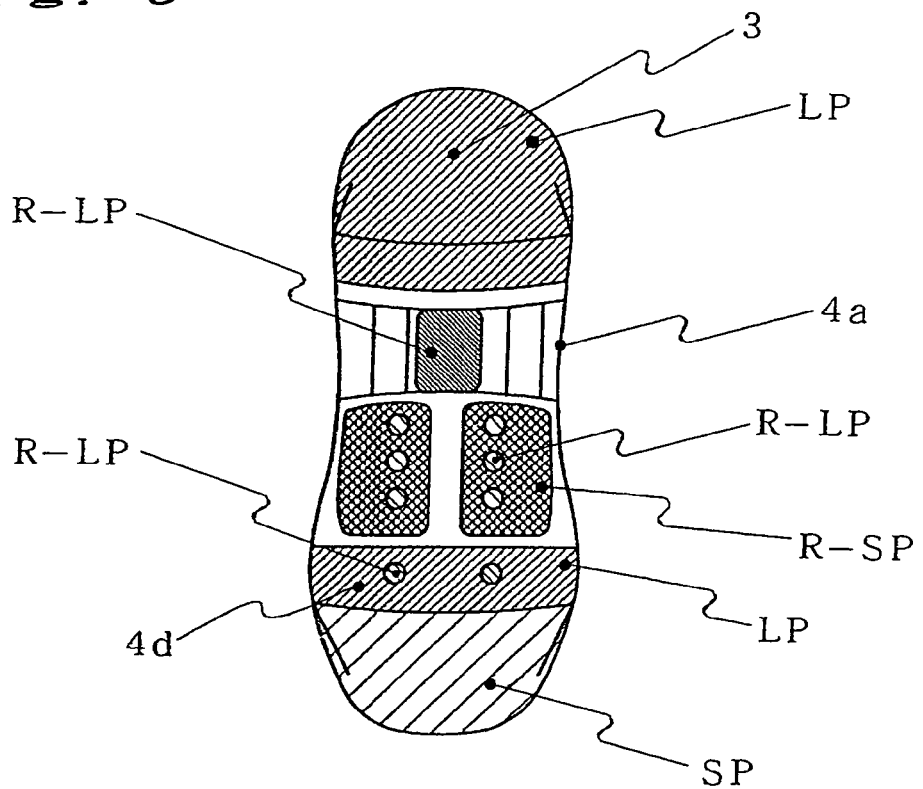
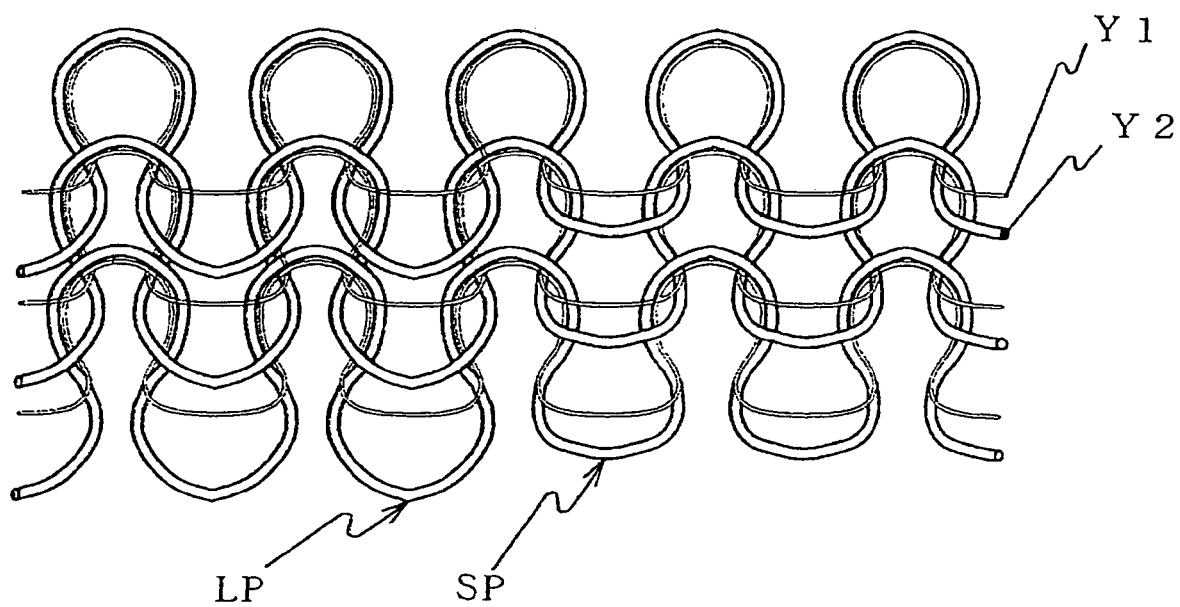

Fig. 12
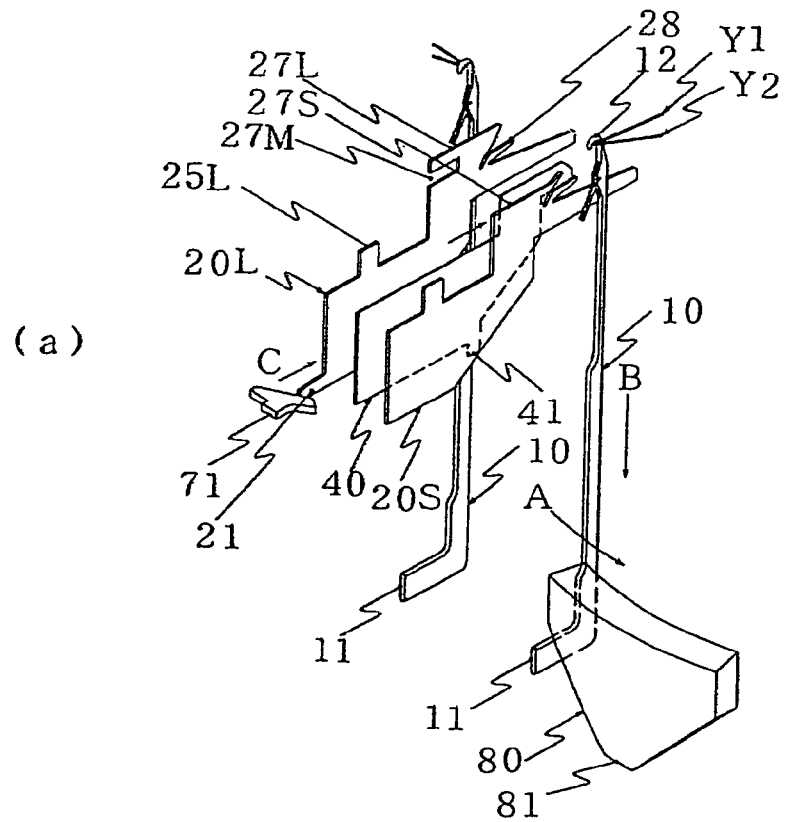
(a)
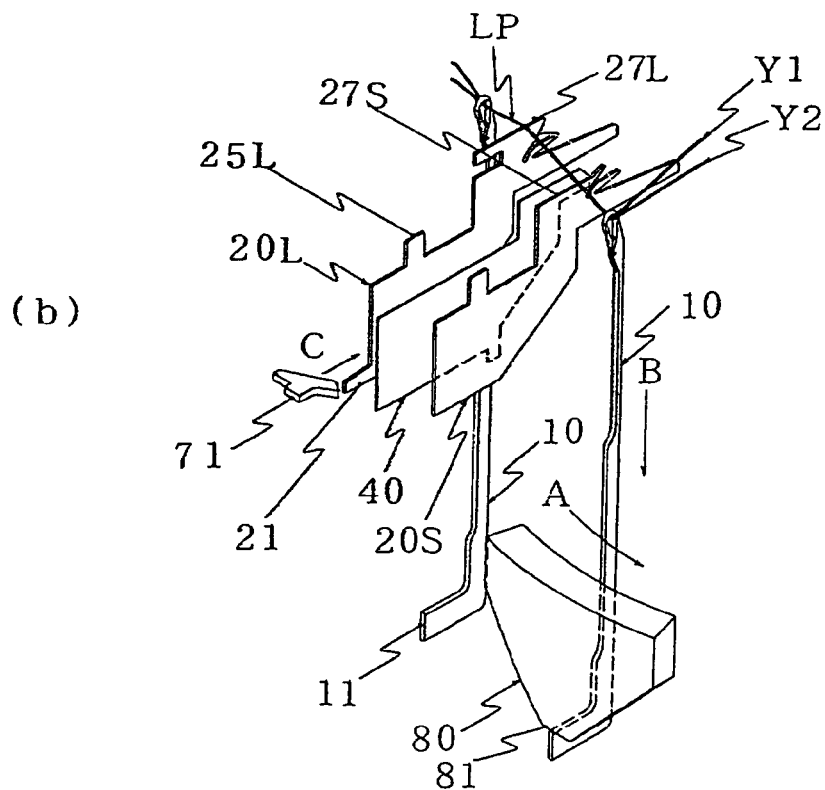
(b)

SOCKS OF MULTI-STAGE PILE STRUCTURE

TECHNICAL FIELD

The present invention relates to a sock in which a portion of at least one of the ground-touching areas of the sock, e.g., the heel portion, sole portion or toe portion, has a knitting structure of a different terry-stitch length from those of the other portions of the same area or of the other areas, according to the weight distribution on the sole, the shock distribution when walking or running, and the sweat-absorbing property required in different sports.

BACKGROUND ART

Traditional terry socks have sole portions that are composed entirely of terry stitches. The purpose of this structure is, primarily, to warm the feet as well as to function as a shock absorber when walking or running. Because of this structure, the sole portion of the sock tends to be thick across its entire area, preventing the transpiration of sweat and in-shoe humidity, and causing a steamy feel. Moreover, because the sole portion is thick across its entire area, the wearer has to choose a shoe of a larger size than his/her actual foot size. In order to eliminate these characteristic flaws of the traditional terry sock, a sock having terry stitches distributed only over the necessary portions was conceived. This sock, known as a partial terry-stitch sock, is disclosed in Patent Document 1.

[Patent Document 1] Unexamined Utility Model Application Publication No. S60-165405

The sock disclosed in Document 1 has, as described in its claims, "terry stitches distributed in different shapes for the left and right feet in accordance with the shapes of the feet and the shoes. The purpose of this sock is to provide compatibility with the shoe that is worn. The Document does not say anything about varying the thickness of the terry-stitch structure. When walking or running, the heel, sole and toe portions are subjected to different degrees of shock. Ideally each portion has a different terry-stitch thickness and cushion performance. In order to eliminate the flaws in Document 1 above, different terry-stitch lengths may be used for different areas of the terry-stitch structure. A sock having such characteristics is disclosed in Patent Document 2.

[Patent Document 2] Utility Model Publication No. 3037207

The sock disclosed in Document 2 above is, as described in its claim 2, "divided into two or more of the portions including the inserting portion A, the calf portion B, the shin portion C, the heel portion D, the spur portion E, the sole portion F, the instep portion G and the toe portion H with each portion having a different terry length." For each section, i.e., area unit such as the heel portion and the sole portion, terry stitches of different terry lengths are formed. Within the same section, knitting structures of the same terry lengths are distributed. However, even within the same section, e.g., the sole portion, different areas are of different shapes and are subjected to different degrees of shock when walking or running. The sock disclosed in Document 2 above cannot provide a cushion performance that complies with the ground-touching pressure distribution on the sole portion. Because the terry stitches have the same length within the same section, there is not enough space between the sole of the foot and the sock that eliminate the steamy feel. Patent Document 3 discloses a terry sock that provides increased ventilation.

[Patent Document 3] Unexamined Patent Application Publication No. 2001-295104

The sock disclosed in Document 3, as described in its claim 1, has "an intermediate portion on the back of the sock where terry-stitched portions and plain-stitched portions are mixed." And as described in its claim 2, "the terry-stitched portions and plain-stitched portions are arranged in a grid." This structure simply incorporates terry stitches in the midst of plain stitches and does not provide a terry distribution or thickness that comply with the shape and ground-touching pressure of each portion of the sole. Patent Document 4 discloses a product having a variety of terry distributions.

[Patent Document 4] Unexamined Patent Application Publication No. H9-41202

The sock disclosed in Document 4 is, as described in its claim 1, a knit product having a terry-stitch portion characterized by terry loops formed on wales of choice by rotating the knitting cylinder in a reciprocating manner. Terry stitches, which are made through a clockwise rotation of the cylinder, and non-terry stitches, which are made through a counter-clockwise rotation, are combined to form terries on the wales. In a clockwise rotation, terry stitches always appear on the same wales. Similarly, terry stitches appear on the same wales in a counter-clockwise rotation. The product made by this method does not have a terry-pressure distribution or terry thickness that corresponds to the shape of the sole or to the distribution of the foot pressure when the foot touches the ground as the wearer walks.

DISCLOSURE OF THE INVENTION

Objectives to be Achieved by the Invention

The present invention is aimed at overcoming the above drawbacks. The sock according to the present invention has at least one area within the ground-touching side of the sock, e.g., a heel portion, sole portion or toe portion where terry stitches of different terry-stitch lengths and shapes are evenly distributed in a "unit stitch for one stitch-loop" fashion.

The first objective of the present invention is to distribute terry stitches of a different thickness in at least one area within the ground-touching side of the sock, e.g., a heel portion, sole portion or toe portion, so as to match the weight distribution and shock experienced by the wearer as he/she walks or runs. The distribution reduces slippage between the sole of the foot, the sock and the insole of the shoe, thereby increasing the grip between the sole of the foot and the shoe.

The second objective of the present invention is to form different structures such as terry stitches, mesh stitches and/or reinforced stitches in at least one area of the ground-touching side of the sock so as to facilitate the absorption and transpiration of sweat according to the purpose of wearing the sock, e.g., sports, mountaineering, walking, etc.

The third objective of the present invention is to improve the durability of the sock by using a terry-stitch structure reinforced with tough yarn material or synthetic fiber yarn for the parts that are prone to abrasion through contact with the shoe or subjected to the wearer's weight.

The fourth objective of the present invention is to reduce the amount of yarn used by not distributing terry stitches in the areas where they are not necessary. This is achieved by setting appropriate terry-stitch length distributions according to the kinds of knitting yarn used.

The fifth objective of the present invention is to make it easier for buyers to choose socks that suit their needs by using different yarn colors for portions of the sock having different terry-stitch lengths and knitting structures.

The sixth objective of the present invention is to provide socks that are tailored to individual wearers by distributing terries of different thicknesses and meshes according to the shape of the foot and the mode of walking and running of the individual wearer.

Means for Achieving the Objectives

According to the present invention, a portion of at least one of the ground-touching areas of the sock has a knitting structure of a different terry-stitch length from those of the other portions of the same area or of the other areas. This makes it possible to alleviate shock and prevent slipping of the sock, making it a rational feature that is not found in conventional socks. It is also possible to provide socks that are appropriately designed for different purposes and seasons, for example, walking socks, jogging socks, mountain-climbing socks, golf socks, spring-and-summer socks and fall-and-winter socks, etc.

Examples of knitting structures of different terry-stitch lengths include long-terry stitches LP and short-terry stitches SP. By varying the terry-stitch length only where necessary, contradicting objectives, i.e., reduction of the total amount of yarn used and assurance of the thickness of the sock and of adequate ventilation can be achieved at the same time.

The long-terry-stitch LP portion may consist of a knitting structure made of long-terry stitches based on mesh stitches M-LP, long-terry stitches with reinforcement yarn R-LP or long-terry stitches based on reinforced mesh stitches M-R-LP. In this case, a portion within at least one of the ground-touching areas of the sock may consist of a knitting structure of mesh stitches that is different from those of the other portions of the same area or of the other areas, or of a structure of a different thickness, or simply thicker, than those of the other portions of the same area or of the other areas.

The short-terry-stitch SP portion may consist of a knitting structure made of short-terry stitches based on mesh stitches M-SP, short-terry stitches with reinforcement yarn R-SP or short-terry stitches based on reinforced mesh stitches M-R-SP. In this case, a portion within at least one of the ground-touching areas of the sock may consist of a knitting structure of mesh stitches that is different from those of the other portions of the same area or of the other areas, or of a structure of a different thickness, or simply thicker, than those of the other portions of the same area or of the other areas.

The sole side of the gore line 6G of the tip 6 may of long-terry stitches LP and the instep side of the gore line 6G may be of short-terry stitches SP. This arrangement helps to alleviate the shock felt through the ground-touching area of the toe portion of the sock when walking or running on a downhill slope.

A certain portion of the sole 4 may be mixed with long-terry stitches LP and short-terry stitches SP in a "unit stitch for one stitch-loop" fashion. This improves the sock's ventilation and facilitates the absorption and transpiration of sweat.

The arch 4C of the foot on the sole 4 side may consist of a mesh structure so as to improve ventilation. This improves the sock's ventilation and facilitates the absorption and transpiration of sweat at the arch 4C of the foot.

The wale number (needle number) at the heel 3 may be at least two thirds of the needle number for the whole in order to make an extended heel, and the gore lines on either side of the toe 6 may form a Y shape. This improves the sock's performance, including its fit and comfort.

The reinforcement yarn Y3 and the terry yarn Y2 may be of different colors so that the reinforced part can be identified by its different color. In this way, buyers of the sock can tell the difference at a glance and select the sock that best suits their individual purpose. The use of different colors also has a design effect.

EFFECTS OF THE INVENTION

According to the invention described in claim 1, it is possible to achieve effective shock absorption that is not provided by conventional socks and to prevent sock-slippage. It is also possible to provide socks optimized for different purposes, such as walking, jogging, mountain climbing and golf, and for different seasons, such as spring/summer and fall/winter.

According to the invention described in claim 2, it is possible to reduce yarn consumption and achieve conventionally conflicting features, i.e., a thicker sock and consistent ventilation by varying the terry length only where necessary.

According to the invention described in claim 3, it is possible to provide a sock featuring optimum ground-touching pressure and shock distribution. By employing a terry-stitch structure with reinforcement yarn applied here and there, it is also possible to increase the durability of the sock.

According to the invention described in claim 4, it is possible to provide a sock featuring improved ventilation and fit. Such a sock allows the formation of an airspace between the bottom of the foot and the insole of the sock and eliminates slippage between the foot and the sock. By employing a terry-stitch structure with reinforcement yarn applied here and there, it is also possible to increase the durability of the sock.

According to the invention described in claim 5, it is possible to alleviate the shock felt through the ground-touching area of the toe portion of the sock when walking or running on a downhill slope.

According to the invention described in claim 6, it is possible to provide the portion that mixes long-terry stitches LP and short-terry stitches SP in a "unit stitch for one stitch-loop" fashion with improved ventilation and absorption and transpiration of sweat.

According to the invention described in claim 7, it is possible to improve the ventilation and the absorption and transpiration of sweat at the arch 4C of the foot.

According to the invention described in claim 8, it is possible to improve the sock's performance including its fit and comfort.

According to the invention described in claim 9, buyers of the sock can tell the difference at a glance and select the sock that best suits their individual purpose. The use of different colors also has a design effect.

THE BEST MODE OF CARRYING OUT THE INVENTION

The best mode of carrying out the present invention will now be explained by reference to an example.

Let us assume making a sock using a plain-stitch fabric having a thickness of 1. A long-terry stitch LP portion having a thickness of 2.5 to 3.5 and a short-terry stitch SP portion having a thickness of 1.5 to 2.4 are distributed at the heel portion 3, sole portion 4 and toe portion 6 according to the distribution of the ground-touching pressures of the sock 1. A mesh portion M and a terry stitch portion that is thicker than the long-terry stitch LP portion and incorporating reinforcement yarn Y3 are arranged on the sole portion 4 according to the ground-touching pressure and shock distribution as well as in order to ensure ventilation for the sock 1. By distributing portions of different thicknesses as in this example, it is possible to make a sock that suits different purposes and seasons.

FIG. 1 is a side view of a sock of the present invention. FIG. 2 is a plan view illustrating the soles of the left sock (a) and right sock (b) each having a heel portion 3, a sole portion 4 and a toe portion 6. This sock is designed for walking. The heel portion 3, which is subjected to a relatively heavy load, is composed of long-terry stitches LP, and the toe portion 6, which is subjected to a relatively light load, is composed of short-terry stitches SP. The sole portion 4 is composed of short-terry stitches SP throughout. In the front sole 4d (i.e., the sole portion near the toes), long-terry stitches with reinforcement yarn R-LP are partially exposed. Along the left side of the sole, short-terry stitches with reinforcement yarn R-SP are exposed in the form of projections between the rear sole 4b and the front sole 4d. The arch of the foot 4c is formed with short-terry stitches based on mesh stitches M-SP.

By arranging the different portions of the sock as described above, it is possible to provide the heel portion 3, which is subjected to the wearer's weight when he/she walks, with a cushioning effect. The toe portion 6, which needs to bend when walking, is made of short-terry stitches SP, whereas the front sole 4d, which is subjected to a kicking shock when walking, is partially provided with long-terry stitches with reinforcement yarn R-LP. Preferably the entire part of the sole area is provided with short-terry stitches SP so as to be able to withstand a medium-sized load and an airspace is formed between the sole of the foot and the insole of the sock. In order to eliminate slippage between the foot and the sock, short-terry stitches with reinforcement yarn R-SP are distributed in the form of dotted protrusions. In addition, in order to improve the ventilation of the arch portion 4c and allow the sock to contact the foot lightly, the arch portion 4c is provided with short-terry stitches based on mesh stitches M-SP.

A sock having the above composition has terry stitches that are efficiently distributed according to the wearer's weight distribution. Such a sock absorbs the shock effectively when the wearer walks and assures excellent ventilation and transpiration of sweat, making it an ideal sock for light walking. The distribution of terries and knitting structures of different thicknesses can be varied according to the purpose for which the sock is used or to the season in which it is worn. Depending on the purpose, the heel portion 3 and the toe portion 6 can also be provided with knitting structures of different thicknesses of terry stitches.

FIGS. 3, 4, 5 and 6 illustrate other embodiments of the present invention.

FIG. 3 is a side view showing an example of a sock designed for light mountaineering in the spring. The heel portion 3 of the sock 1 is composed of long-terry stitches LP. The narrowing course (the sole side of the gore line 6G) of the toe portion 6 is made of long-terry stitches LP so as to alleviate any shock to the ground-touching area at the toe portion of the sock 1 when walking downhill. The widening course (the instep side of the gore line 6G) is made of short-terry stitches SP. The sole portion 4 of the sock 1 is divided into a front sole 4d, composed of long-terry stitches based on mesh stitches M-LP, and a middle portion, composed of short-terry stitches based on reinforced mesh stitches M-R-SP, so as to achieve a cushioning effect and ventilation at the same time. In order to give the sock 1 firmer leg support, the leg portion 2 is provided with a support 2a inlaid with elastic yarn, and the portion extending from the sole portion 4 including the arch to the instep side of the foot is also provided with a support 4a inlaid with elastic yarn.

FIG. 4 is a plan view of the sole of a sock designed for jogging in spring and summer. The sock is for the left foot. In the case of jogging, ventilation and absorption and transpiration of sweat are important considerations. Accordingly, the front sole 4d is made of a structure LP/SP combining long-terry stitches LP and short-terry stitches SP mixed in a pattern of dapples, and a portion of the sole 4 and the arch 4c of the foot are composed of a mesh M structure in order to ensure ventilation. In order to optimize the load from running, the heel portion 3 and the rear sole 4b are made of long-terry stitches LP, while the toe portion 6 is made of short-terry stitches SP to facilitate light running.

FIG. 5 is a plan view of the sole of a sock in which there is no distinction between the right sock and left sock (both having the same shape). This sock is designed for ordinary walking. In the case of ordinary walking, the weight distribution over the entire area of the sole 4 is an important consideration. Accordingly, the front sole 4d is made of long-terry stitches LP, and a mesh M groove is formed in such a way as to form a space for capturing and retaining sweat. In the middle of the sole 4, long-terry stitches based on reinforced mesh stitches M-R-LP are arranged in the front-to-rear direction in such a way as to form a space consisting of an air layer so as to reduce the fatigue of the sole of the foot. The heel 3 and the rear sole 4b are made of long-terry stitches LP and the toe portion 6 is composed of short-terry stitches SP.

FIG. 6 is a plan view of a sock specifically designed for golfing. In the case of golfing, the cushion on the ground-touching area and the grip between the shoe, sock and sole of the foot when playing are both important. The heel portion 3 is composed of long-terry stitches LP in order to receive the load effectively, and the middle part of the sole 4 is composed of short-terry stitches with reinforcement yarn R-SP. In order to provide the sole of the foot with a grip, long-terry stitch projections with reinforcement yarn R-LP are arranged like buttons in the front-to-rear direction of the sock. The front sole 4d, which is subjected to a relatively heavy load, is composed of long-terry stitches LP and partially reinforced with long-terry projections with reinforcement yarn R-LP. In order to prevent slippage, the sock is provided with a support 4a inlaid with elastic yarn, which is further provided with long-terry stitches with reinforcement yarn R-LP in order to stabilize the foot and to form an air layer in it.

Portions other than the heel 3, sole 4 and toe 6—specifically, the leg portion 2 and instep side 5 of the foot—may also be provided with various kinds of terry stitches of the present invention in order to design a sock with improved ventilation and foot protection. The wale number for the heel portion 3 of the sock may be increased to make a wide heel structure, or the narrowing and the widening of the toe portion 6 may be increased to make a Y gore line to further improve the sock's wearing performance, or more specifically, its fit and comfort.

FIGS. 7, 8, 9 and 10 show examples of knitting structures according to the present invention.

FIG. 7 shows a structure knitted of ground yarn (back yarn) Y1 and terry yarn Y2, in which short-terry stitches SP with long sinker loops of terry yarn Y2 and long-terry stitches LP with even longer sinker loops are knitted.

FIG. 8 shows a mesh stitch structure in which terries are formed. For example, the floating part F of terry yarn Y2 based on mesh stitches M is prolonged to form short-terry stitches based on mesh stitches M-SP and further prolonged to form long-terry stitches based on mesh stitches M-LP.

FIG. 9 shows a structure made by knitting reinforcement yarn Y3 into the mesh structure terries of FIG. 8 Reinforcement yarn Y3 increases the thickness of the fabric and the floating part F of the terry yarn Y2 is prolonged to form short-terry stitches M-R-SP and further prolonged to form long-terry stitches M-R-LP.

FIG. 10 shows a reinforced terry structure with reinforcement yarn Y3 made by further knitting reinforcement yarn Y3 into the structure shown in FIG. 7. The reinforcement yarn Y3 is knitted in a mesh stitch and floated F here and there, but the terry yarn Y2 is not floated and forms short-terry stitches R-SP and long-terry stitches R-LP.

As described above, by incorporating terries in a mesh-stitch structure or a knitting structure with reinforcement in a portion of at least one of the ground-touching areas of a sock, the structure in question can have a different terry-stitch length from those of other portions of the same area or of other areas. Terry stitches having different thicknesses and knitting spaces can be distributed according to different purposes.

As has been explained, in the present invention, different structures made of plain stitches P, short-terry stitches SP, long-terry stitches LP, meshes M, short-terry stitches based on mesh stitches-M-SP, long-terry stitches based on mesh stitches M-LP, short-terry stitches based on reinforced mesh stitches M-R-SP, long-terry stitches based on reinforced mesh stitches M-R-LP, short-terry stitches with reinforcement yarn R-SP or long-terry stitches with reinforcement yarn R-LP and having different thicknesses and gap ratios are distributed in a portion within at least one of the ground-touching areas of the sock. In this way, it is possible to design and make available for users a sock that is optimized for the purpose and for the season in which it is used.

Test data of the thickness of different knitting structures are provided as examples in the following paragraph. These data have been obtained by measuring the absolute thickness of a structure knitted with 30/75s polyester and polyurethane covering yarn for the ground yarn Y1, three strands of 32-count cotton and polyester synthetic yarn for the terry yarn Y2, and 110 denier nylon for the reinforcement yarn Y3, using a pressure-characteristics-measuring thickness gauge at a pressure of 10 gf/cm$^2$.

TABLE 1

| | Knitting structure | Code | Thickness mm |
|---|---|---|---|
| 1 | Plain stitch | P | 1.40 |
| 2 | Short-terry stitch | SP | 2.86 |
| 3 | Long-terry stitch | LP | 4.05 |
| 4 | Mesh | M | 1.31 |
| 5 | Short-terry stitch based on mesh stitch | M-SP | 1.69 |
| 6 | Long-terry stitch based on mesh stitch | M-LP | 3.01 |
| 7 | Short-terry stitch based on reinforced mesh stitches | M-R-SP | 3.53 |
| 8 | Long-terry stitch based on reinforced mesh stitches | M-R-LP | 4.27 |
| 9 | Short-terry stitch with reinforcement yarn | R-SP | 3.40 |
| 10 | Long-terry stitch with reinforcement yarn | R-LP | 4.14 |

The thickness of the knitting structure depends on the type of knitting yarn used. By differentiating the thickness of the yarn for different parts of a sock, a variety of thicknesses can be obtained for different parts.

In this way, by using a knitting structure of a different thickness, ventilation and air-holding gaps for a portion of at least one of the ground-touching areas, the sock can be provided with previously non-existent features.

Figure 11:
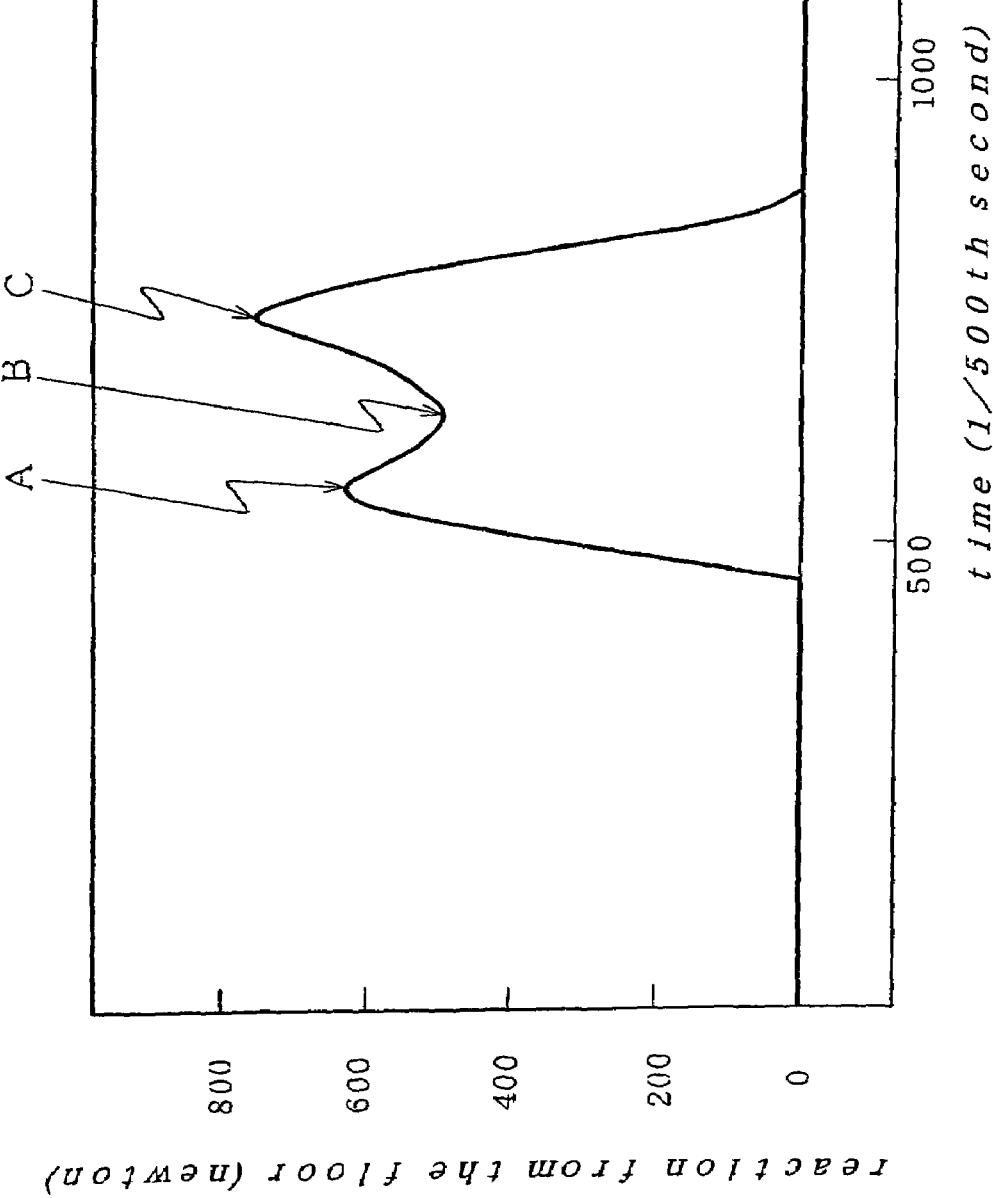

FIG. 11 shows an example of changes in the reaction force from the floor to the sole changes when walking as measured by a floor-reaction meter.

In this graph, the horizontal axis represents time in units of 1/500th second, and the vertical axis represents the reaction from the floor in newtons. In this graph, point A represents the instant at which the heel portion touches the floor. It is evident that a shock is imparted at this instant. At point B, the entire area of the sole of the foot touches the ground. The shock is relatively weak and the reaction force from the floor fluctuates rapidly. Point C represents the instant at which the foot kicks the ground to generate thrust for walking. An impact is applied to the front sole 4d.

From the above observations, it is evident that for an ordinary walking sock, the best effect is achieved by distributing long-terry stitches LP to the heel portion 3 and short-terry stitches to the sole portion 4 and partially including long-terry stitches with reinforcement yarn R-LP in the front sole 4d. The toe portion 6 is preferably formed with short-terry stitches SP so as to facilitate bending of the toes.

FIG. 12 shows an example of a knitting method according to the present invention. The illustrations show parts of a circular sock-knitting machine in which knitting needles 10, a long-terry sinker 20L, a fixed plate 40 and a short-terry sinker 20S are visible. The long-terry sinker 20L, fixed plate 40 and short-terry sinker 20S are located between the two knitting needles 10. The long-terry sinker 20L is equipped with a high-terry sinker nib 27L for knitting long terries LP and the short-terry sinker 20S is equipped with a short-terry sinker nib 27S for knitting short terries SP.

The knitting needle 10 descends (indicated by arrow B) activated by a stitch cam 80 and knits ground yarn Y1 and terry yarn Y2. Then the long-terry sinker 20L moves forward (indicated by arrow C). At this time the terry yarn Y2 rides on the high-terry nib 27L and forms a long sinker loop, i.e., a long terry LP.

The short-terry sinker 20S is always in the forward position. When the long-terry sinker 20L does not move forward, the terry yarn Y2 rides on the low-terry nib 27S and forms a short sinker loop, i.e., a short terry SP.

The fixed plate 40 has the function of separating the long-terry sinker 20L and the short-terry sinker 20S and preventing their mutual adhesion.

The long-terry sinker 20L is equipped with a selector butt 21 for selecting whether or not to move the sinker forward (arrow C). An actuator head 71 receives a computer signal that decides whether or not to push the selector butt 21. This makes it possible to knit long-terry stitches LP in a "unit stitch for one stitch-loop" fashion in any portion of the fabric.

It is also possible to equip the short-terry sinker 20S with a selector butt and to selectively move the short-terry sinker 20S. Terries can be knitted in ways other than by the method described above. A flat knitting machine or a circular knitting machine other than for socks can also be used to knit a sock of the present invention.

By knitting reinforcement yarn Y3 simultaneously, short-terry stitches with reinforcement yarn R-SP and long-terry stitches with reinforcement yarn R-LP with varied terry-stitch thicknesses can be knitted.

By performing float stitches, i.e., mesh stitches using pattern selecting of the knitting needles 10, short-terry stitches based on mesh stitches M-SP and long-terry stitches based on mesh stitches M-LP can be knitted. By further knitting reinforcement yarn Y3 in these stitches, short-terry stitches based on reinforced mesh stitches M-R-SP and long-terry stitches based on reinforced mesh stitches M-R-LP can be knitted.

BRIEF DESCRIPTIONS OF THE DRAWINGS

Figure 1:
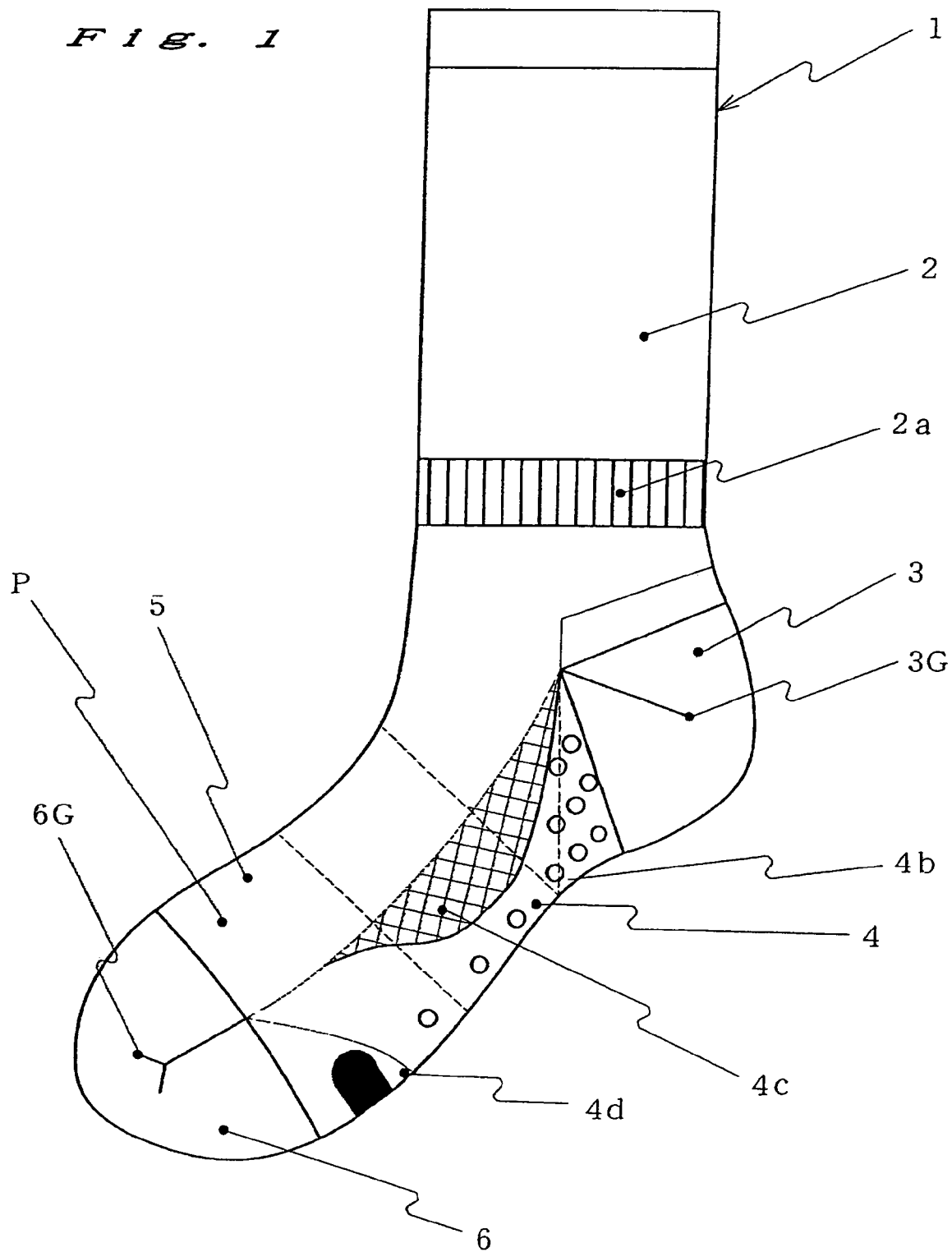

FIG. 1 is a side view showing an example of a sock of the present invention.

Figure 2:
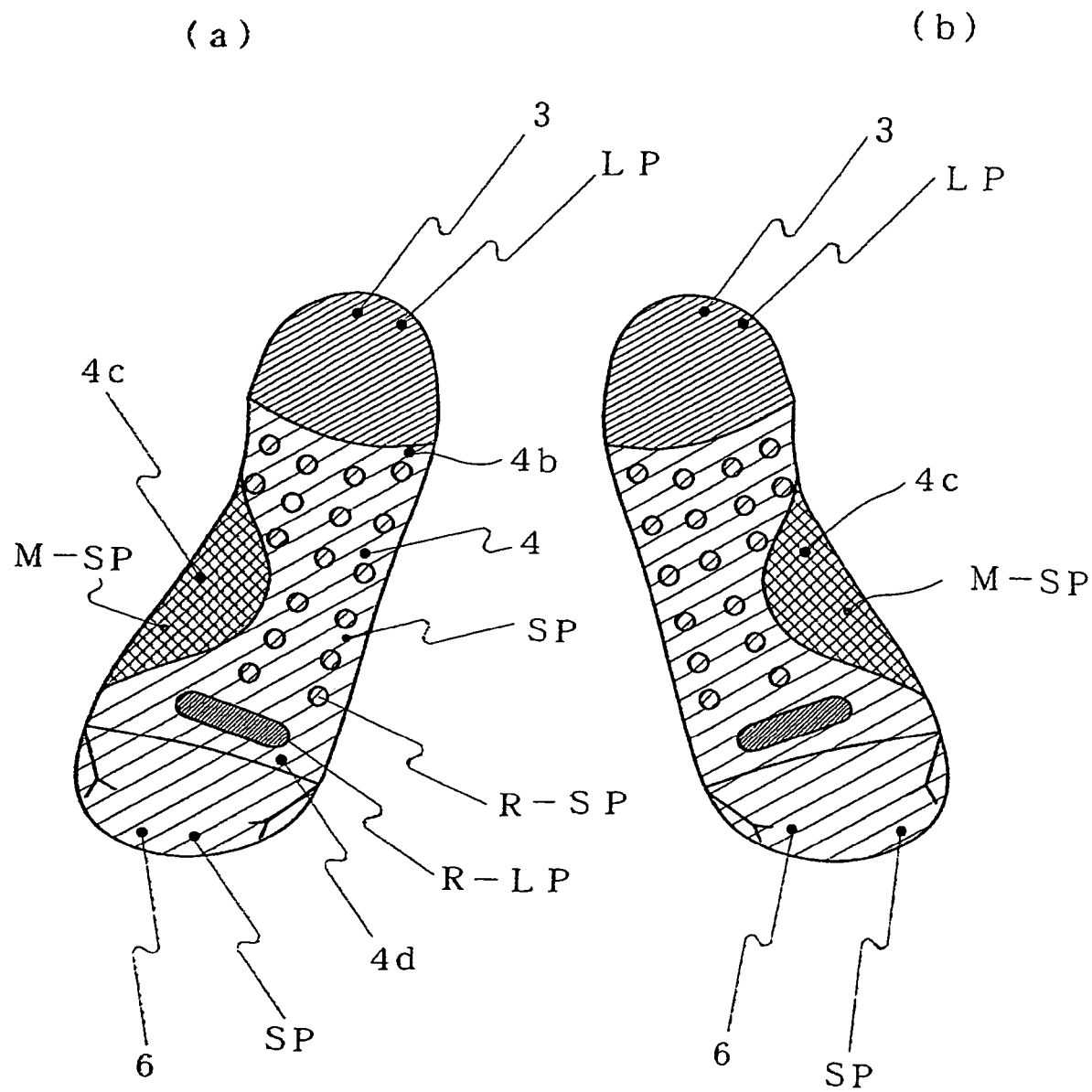

FIG. 2 is a plan view showing the bottom of the sock shown in FIG. 1. (a) is for the left foot and (b) is for the right foot.

Figure 3:
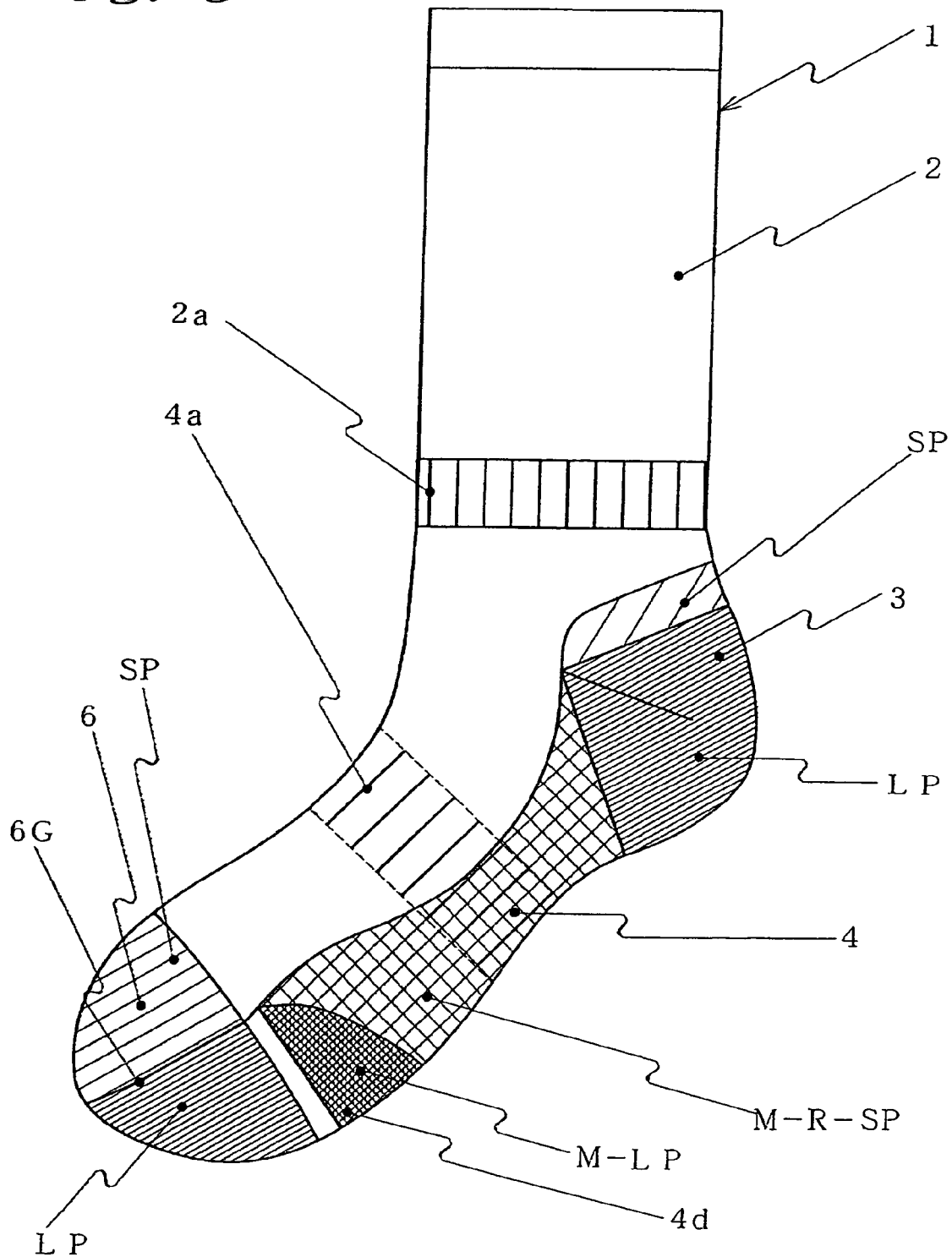

FIG. 3 is a side view of an example of a sock designed for light mountaineering in spring and summer, which is an embodiment of the present invention.

Figure 4:
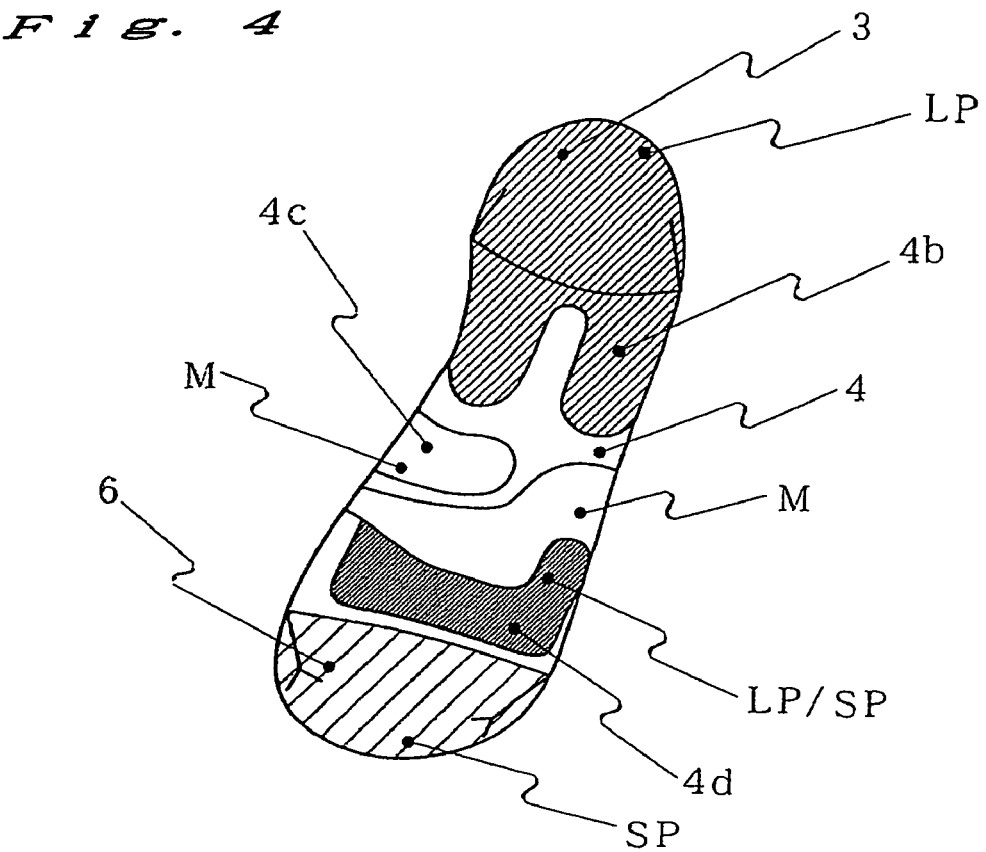

FIG. 4 is a plan view of the bottom of a left sock designed for jogging in spring and summer, which is an embodiment of the present invention.

Figure 5:
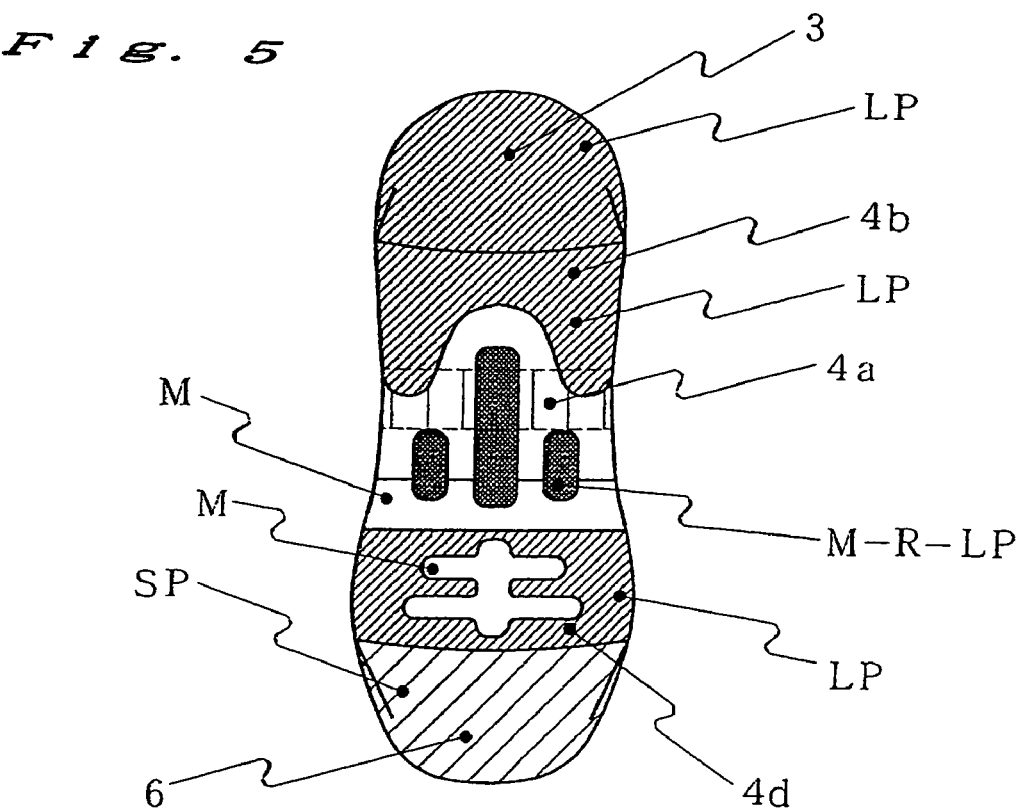

FIG. 5 is a plan view of the bottom of a sock, which can be worn on the left foot or right foot so it is convenient for ordinary walking, which is an embodiment of the present invention.

FIG. 6 is a plan view of the bottom of a sock suitable for golfing, which is an embodiment of the present invention.

FIG. 7 shows an example of a knitting structure of a sock of the present invention, which is knitted with ground yarn (back yarn) and terry yarn. The terry yarn has some sinker loops that are prolonged to form short terries and other sinker loops that are further prolonged to form long terries.

Figure 8:
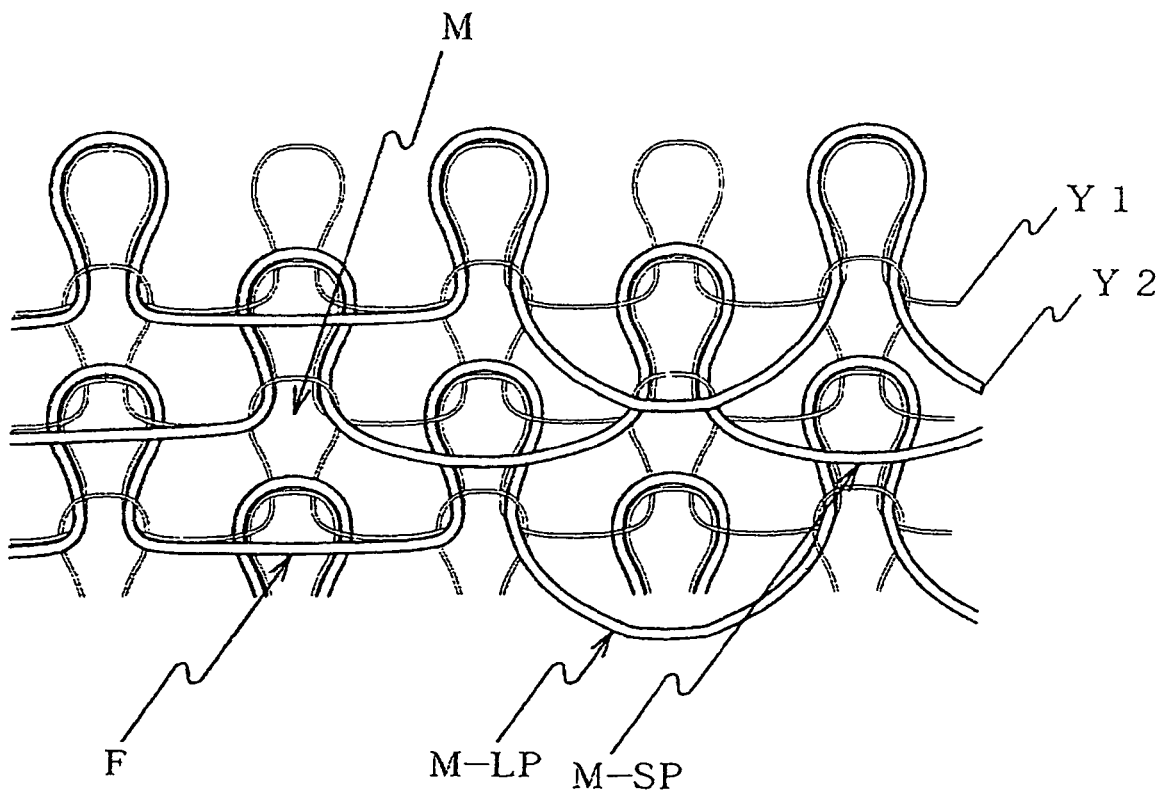

FIG. 8 shows an example of a knitting structure of a sock of the present invention, in which the mesh terry yarn has some floating parts that are prolonged to form short terries and other floating parts that are further prolonged to form long terries.

Figure 9:
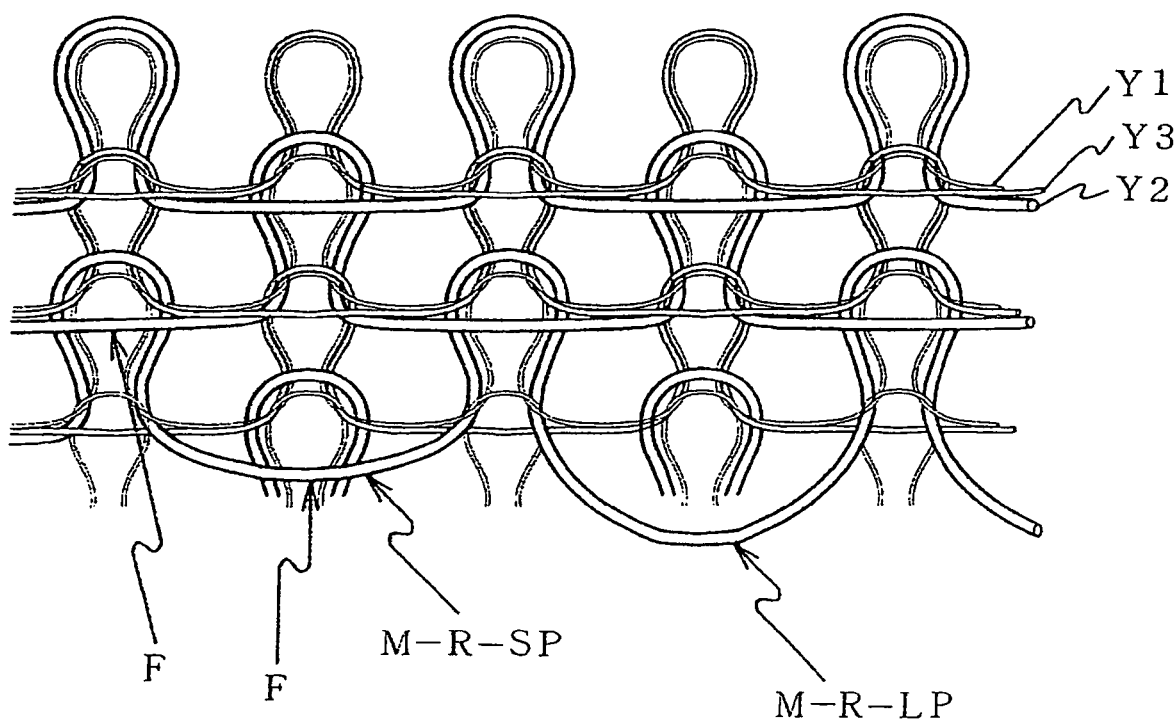

FIG. 9 shows an example of a knitting structure of a sock of the present invention, in which reinforcement yarn is used to increase the thickness of the knitting structure, and the terry yarn has some floats that are prolonged to form short terries and other floats that are further prolonged to form long terries.

Figure 10:
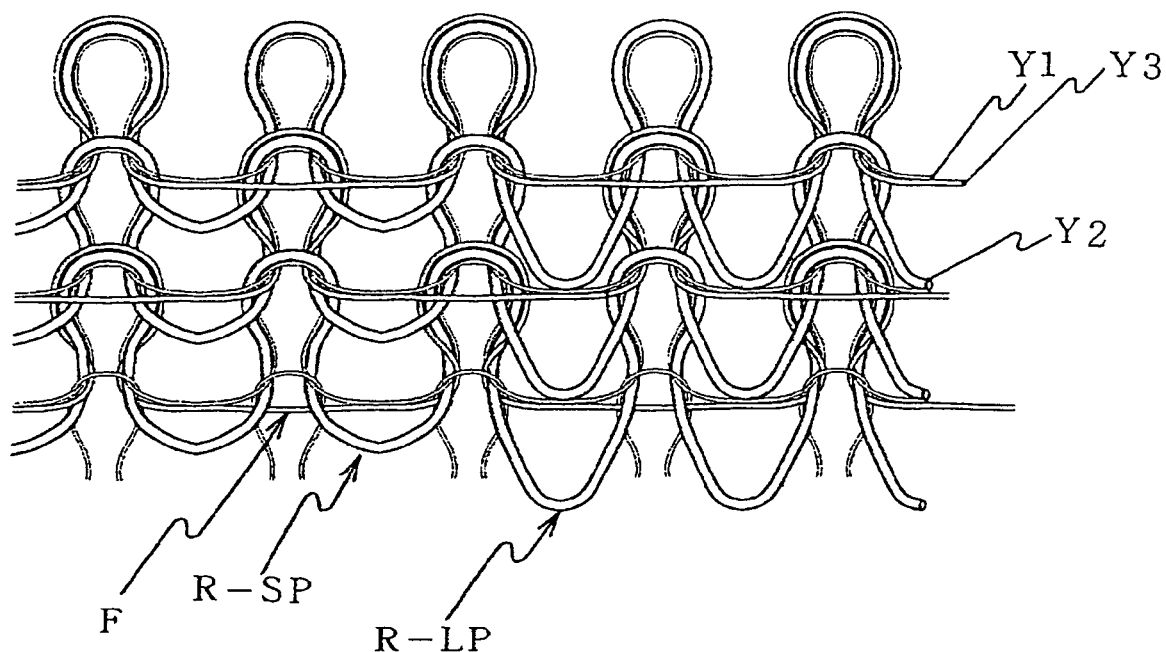

FIG. 10 shows an example of a knitting structure of a sock of the present invention, in which reinforcement yarn is further knitted in the structure of FIG. 7 to make it a terry-stitch structure with reinforcement yarn.

FIG. 11 is a graph showing an example of a measurement of the reaction force from the floor applied to the bottom of the foot when walking.

FIG. 12 is a perspective view illustrating an example of a sock-knitting method of the present invention.

DESCRIPTION OF THE REFERENCE SYMBOLS

1: sock
2: leg
2a: support of the leg portion
3: heel
3G: gore line of the heel
4: sole portion
4a: support of the sole portion
4b: the rear sole
4c: the arch of the foot
4d: the front sole (sole portion near the toes)
5: instep side of the foot
6: toe portion
6G: gore line of the toe
10: knitting needle
20L: long-terry sinker
20S: short-terry sinker
21: selector butts
27L: high-terry sinker nib
27S: low-terry sinker nib
40: fixed plate
71: the head of the actuator
80: stitch cam
Y1: ground yarn
Y2: terry yarn
Y3: reinforcement yarn
P: plain stitches
SP: short-terry stitches
LP: long-terry stitches
M: mesh stitches
F: float stitch(es)
M-SP: short-terry stitches based on mesh stitches
M-LP: long-terry stitches based on mesh stitches
M-R-SP: short-terry stitches based on reinforced mesh stitches
M-R-LP: long-terry stitches based on reinforced mesh stitches
R-SP: short-terry stitches with reinforcement yarn
R-LP: long-terry stitches with reinforcement yarn

The invention claimed is:

1. A terry sock of a multi-stitch-length structure in which knitting structures of
long-terry stitches (LP) that are formed by an action of a high-terry sinker and
short-terry stitches (SP) that are formed by an action of a short-terry sinker separate from and shorter in height than the high-terry sinker
are mixed and distributed along a length of a ground-touching portion of the sock from toe to heel thereof in a unit stitch for one stitch-loop of a width within one wale fashion.

2. The terry sock of a multi-stitch-length structure according to claim 1 in which
knitting structures comprising
a knitting structure of long-terry (LP) stitches selected from any of long-terry stitches based on mesh stitches (M-LP), long-terry stitches with reinforcement yarn (R-LP) or long-terry stitches based on reinforced mesh stitches (M-R-LP), and
a knitting structure of short-terry (SP) stitches selected from any of short-terry stitches based on mesh stitches (M-SP), short-terry stitches with reinforcement yarn (R-SP) or short-terry stitches based on reinforced mesh stitches (M-R-SP)
are distributed in the ground-touching portion of the sock.

3. The terry sock of a multi-stitch-length structure according to claim 1 or 2 in which the sole side of the gore line (6G), namely the narrowing course of the toe (6) is composed of long-terry stitches (LP) and the instep side, namely the widening course of the gore line (6G) of the toe (6) is composed of short-terry stitches (SF).

4. The terry-sock of a multi-stitch-length structure according to claim 2 in which reinforcement yarn (Y3) and terry yarn (Y2) of different colors are used so that the reinforced portions can be identified by their difference in color.

* * * * *